United States Patent [19]

Smith

[11] Patent Number: 5,542,644
[45] Date of Patent: Aug. 6, 1996

[54] PLUG-VALVE HAVING A PLUG ASSEMBLY WITH RETRACTIBLE SEALS THAT CAN BE REMOVED WITHOUT LEAKAGE

[75] Inventor: Gordon M. Smith, Brookshire, Tex.

[73] Assignee: Johnston Pump/General Valve, Inc., Brookshire, Tex.

[21] Appl. No.: 460,969

[22] Filed: Jun. 5, 1995

[51] Int. Cl.$^6$ ........................... F16K 5/14
[52] U.S. Cl. ........................... 251/163; 251/188
[58] Field of Search ........................... 251/161, 162, 251/163, 188

[56] References Cited

U.S. PATENT DOCUMENTS

2,612,340  9/1952  Laurent ........................... 251/163 X
4,623,119  11/1986  van der Wiel.

Primary Examiner—John C. Fox
Attorney, Agent, or Firm—Leonard Tachner

[57] ABSTRACT

An improved plug type valve of the type having seat and reseat retractable seals, the plug assembly having a tapered faceted cylindrical plug with a waterway therethrough. A first pair of shut-off slips is positioned on the plug for axial movement, relative to the plug, wherein the plug surfaces adjacent the shut-off slips are tapered for retracting the shut-off slips as the plug is moved vertically in a first direction relative to the inlet and the outlet of the valve. A pair of thru-bore slips are positioned on the plug adjacent the waterway for relative axial movement therebetween. The plug surfaces adjacent the thru-bore slips are tapered for retracting the thru-bore slips as the plug is moved vertically in a second direction, relative to the inlet and outlet of the valve. The thru-bore slips have a thru-bore aperture to permit flow through the waterway without leakage around the plug and thus the interior of the valve body, when the waterway is aligned with the inlet and outlet.

12 Claims, 5 Drawing Sheets

PLUG-VALVE HAVING A PLUG ASSEMBLY WITH RETRACTIBLE SEALS THAT CAN BE REMOVED WITHOUT LEAKAGE

BACKGROUND OF THE INVENTION

1. Field of the Invention

The present invention relates generally to plug valves of the type having an inlet and an outlet and a valve body in which a plug with a waterway therethrough may be configured to provide a path from the inlet to the outlet through the waterway for passage of a fluid therethrough or may alternatively be positioned with the waterway perpendicular to the inlet and outlet for blocking the flow of fluid therethrough. The present invention relates more specifically to a retracting seal valve in which two distinct pairs of slips are slidably attached on respective oppositely tapered surfaces of the plug wherein vertical upward motion of a tapered faceted cylindrical plug causes seal retraction of one pair to permit a quarter turning motion of the plug to open the valve and wherein in continued upward motion of the plug wedges the perpendicular pair outwardly, the reseating slip seals allowing the retracted slips to be changed without draining the line and without leakage from the waterway into the valve body.

2. Prior Art

Plug-type valves are well-known in the art. Often such plug-type valves are implemented with slips and seals in a seat and reseat configuration. The slips and seals provide means for blocking the flow through the valve at both the inlet and outlet ports when the valve is in the closed position. This permits maintenance personnel to bleed the valve body with the valve in its closed position with a minimum expenditure of time and labor costs. Typically, the plug slips are interconnected so that in opening the valve from its fully closed position, (beginning with the valve in the seated/closed position) the first motion of the plug is upward vertical in one direction which has the effect of retracting the slips from the inside surface of the valve body in order to prevent scoring of the valve seals in the subsequent motion when the valve is turned to place the flow passage to be in line with the inlet and outlet. However, in conventional plug-type valves which employ slips and seals as described above, after the flow passage has been partially aligned with the inlet and outlet, vertical motion of the plug is then again required in a direction opposite to that of the initial vertical motion (downward) which retracted the slips. This second oppositely directed vertical motion in effect reseats the valve by placing the flow passage in the plug in intimate contact with the inlet and outlet respectively and finishing alignment. This motion drags a tapered plug across a tapered body.

Although such seat and reseat valves have had good commercial success, the aforementioned motion of the plug in opening or closing the valve, namely, vertical motion in a first direction, the 90 degrees rotation and then vertical motion in a second direction opposite to the first, generally increases the cost of the valve because of the complexity of the operator mechanism to which the plug is connected. The operator mechanism is complex because it has a three piece stem set to transform the aforementioned vertical motion, rotational motion and oppositely directed vertical motion into a undirectional motion in a hand operator or automatic operator. Consequently, the cost of manufacture, maintenance and repair of such a complex operator is higher than it would be if it were possible to simplify the motion of the plug between the valves open and closed positions. For example, if it were possible to design a plug-type valve in which the motion of the plug were vertical, rotational and vertical in opening and closing, wherein both vertical portions of the operation sequence were in the same direction for opening the valve and in the same direction for closing the valve, then the operating mechanism to which the plug trunnion were attached would be significantly simpler. The operator would also be less costly to manufacture, maintain and repair thereby reducing the overall costs for the valve while still providing a double block and bleed feature of the prior art valves described above as well as the reseat feature which allows the slips to be changed without draining the line.

There are two basic types of retracting seal valves presently in existence. One such type is the twin seal valve. This type uses a vertical upward motion of a tapered faceted cylindrical plug to cause seal retraction followed by a quarter turning motion to open the valve. In this type of valve, clearance between the waterway and the body cavity prevails during the entire open status of the valve. As a result, the pipe line that is the source of fluid pressure to the valve must be drained to change slips. A second type of valve, normally referred to as a seat and reseat type, utilizes a vertical upward motion of a tapered faceted conical plug to cause seal retraction, followed by a quarter turning motion to open the valve. But the the seat and reseat type valve vertically descends a tapered conical plug to reseat, creating a metal-to-metal contact. In this type of seal valve, there is a minimal opening between the waterway and the body cavity which allows the slips to be changed without draining the line. However, the metal-to-metal reseat still permits some leakage. A third type of seal valve has been disclosed in U.S. Pat. No. 4,623,119. This type of seal valve begins and ends with vertical upward motion using a tapered plug that is inverted compared to conventional plugs. This unidirectional motion solves the operator complexity problem in this type of seal valve, the opening between the waterway and the body cavity is minimal, thus allowing the slips to be changed without draining the line. But once again, some leakage is expected between the waterway and the body cavity when the valve is opened.

Thus based on the foregoing, it can be seen that all of the prior art seat and reseat type plug valves suffer the disadvantage of having at least a limited degree of leakage of the fluid between the waterway and the interior cavity of the valve body. Although such leakage is insufficient to require drainage of the line for replacement of maintenance of the slips, it is still inefficient and inconvenient in that some leakage of the line occurs during slip maintenance.

A preferred plug assembly and valve body cavity are cylindrical rather than conical. Cylindrical shapes are easier to machine and match. Also, wear due to direct contact between the plug and body cavity (i.e., rubbing) is easier to avoid in a cylindrical plug/cavity seat and reseat plug valve. Furthermore, cylindrical bodies can be standardized to increase productivity.

Thus, there is a continuing need for a seat and reseat plug type valve in which there is both a unidirectional opening or closing action as well as no leakage between the waterway and the interior cavity of the valve body when the valve is in its open position, thus making it possible to simplify the valve operator body and plug and to replace and maintain seals without draining the line, but also to incur absolutely no leakage during such slip maintenance.

SUMMARY OF THE INVENTION

The present invention solves the aforementioned ongoing need by providing a plug-type valve having a plug assembly wherein a vertical upward motion of a tapered segemented cylindrical plug causes seal retraction. This vertical motion is followed by a quarter turning motion to partially open the valve, then continued upward motion of a tapered segmented cylindrical plug wedges outwardly reseating slip seals, allowing the slips to be changed without draining the line and without any leakage.

The plug of the present invention has faceted surfaces each having a tapering direction and wedge shape that drives a pair of seating seals outward with a vertical down motion. A dovetail is used to attach the slip to the plug. The plug also has on the same faces as the waterway, a wedge shape with inverted tapering that drives a pair of reseating slips outwardly with a vertical up motion of the plug. These reseating slips have apertures which coincide with the waterway aperture when the plug is fully up and reseated in its open position. A pair of guides or dovetail halves are used outboard of the conduit waterway holes in the slips to attach the reseating slips to the plug. A seal may be provided on the backside or plug side of the reseating slip to seal the leak path whereby to prevent all possible leakage between the waterway and the interior cavity of the valve body.

There are a number of significant advantages resulting from this configuration. First, this configuration has the advantage of permitting implementation with a two piece stem operator which is both smaller and cheaper than conventional seat and reseat valve operators. It is implemented using a cylindrical plug body and valve cavity, thus making the plug and valve easier to machine and match for replacement. No dirt can accumulate in the normally open position of the plug. Most significantly, the seating slips normally used to seal the valve plug against the pressure fluid in the closed position of the valve, can be readily replaced or repaired when the valve is configured in its open configuration without any leakage of the fluid. Leakage is prevented because the reseating slips prevent leakage of the fluid from the waterway into the valve body interior.

OBJECTS OF THE INVENTION

It is therefore a principal object of the present invention to provide a retracting seal plug valve in which the seating slips of the valve, namely those slips which seal the valve in its closed position can be readily repaired or replaced by removing those shutoff slips from the valve by means of a lower plate without external leakage.

It is another object of the present invention to provide a seat and reseat retracting seal valve in which opening or closing of the valve may be accomplished through vertical movement of the plug or the valve in a single direction, accompanied by a simple quarter turn motion, thereby providing for opening and closing, using a simple valve operator.

It is still an additional object of the present invention to provide an improved seat and reseat retracting seal valve, having a plug assembly wherein the plug surface does not come in contact with the interior valve cavity surface and is not used for a seating surface when the valve is in the open position.

It is still a further object of the present invention to provide an improved seat and reseating plug type valve having retracting seals, two of which are positioned on the fluid blocking surfaces of the plug, two of which are positioned on the waterway surfaces of the plug, the latter being configured on the plug to retract when the plug is moved in a first vertical direction and the former being configured on the plug to retract when the valve plug is moved vertically in a second direction, wherein the first and second directions are opposite to one another.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
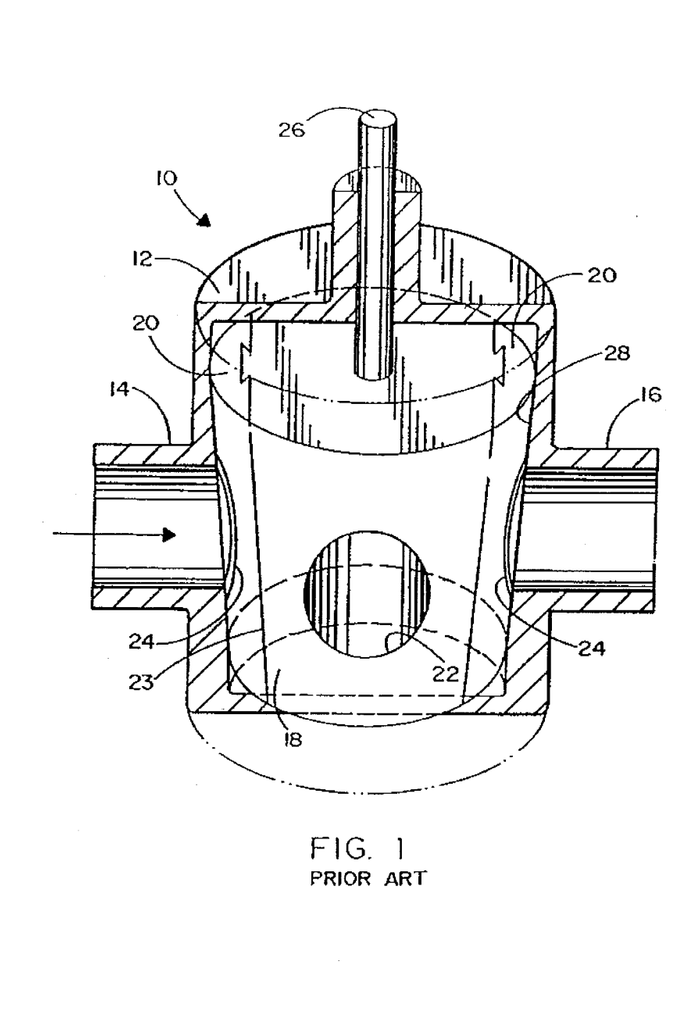
FIGS. 1 through 4 are prior art illustrations of a plug-type valve, illustrating a typical valve configuration in which the plug assembly of the present invention may be readily utilized.

In order to provide a better understanding of the present invention, reference will first be made to FIGS. 1 through 4 which show a prior art plug-type valve in various configurational changes between its fully closed and fully opened positions. Therefore, referring first to FIG. 1 it will be seen that a conventional plug valve 10 of the prior art comprises a valve body 12 having an inlet 14, an outlet 16 and a plug 18, the latter connected by means of dovetail interconnection to a pair of slips 20. Plug 18 also comprises a flow passage 22 which, in the valve's fully closed position as seen in FIG. 1, is substantially perpendicular to the inlet 14 and the outlet 16. As seen further in FIG. 1, the plug 18 is connected to a trunnion 26 which is connected in turn to a mechanical operator (not shown) which is adapted to apply the necessary vertical and rotational motion to the trunnion and plug in order to open and close the valve.

The shape of the plug 18 combined with the slips 20 and of the interior surface 28 of the valve body 12 are substantially conical or conical truncations with the larger diameter of respective geometries being greatest at the top of the valve body and smallest at the bottom of the valve body. In other words, the apex of the cones defining the shape of the interior surface 28 of the valve body 12 and of the plug and slip combination would be positioned somewhere below the valve 10 along the axis through the trunnion 26. Furthermore, it will be seen that the slips 20 are in this prior art configuration, of substantially constant thickness throughout their height between the lower portion of the valve body and the upper portion thereof. Consequently, in the closed position of the valve as illustrated in FIG. 1, the plug 18 is in its lowermost position thereby extending the slips 20 toward the inlet and outlet respectively whereby a pair of seals 24 are in compressed engagement with the interior surface of the valve body 28 immediately adjacent to the inlet and outlet passages. This compressed engagement of the seals 24 with the surface surrounding the inlets and outlets 14 and 16 respectively, assures that there is flow blockage of both the inlet and outlet while the valve is in its fully closed position as illustrated in FIG. 1.

Figure 2:
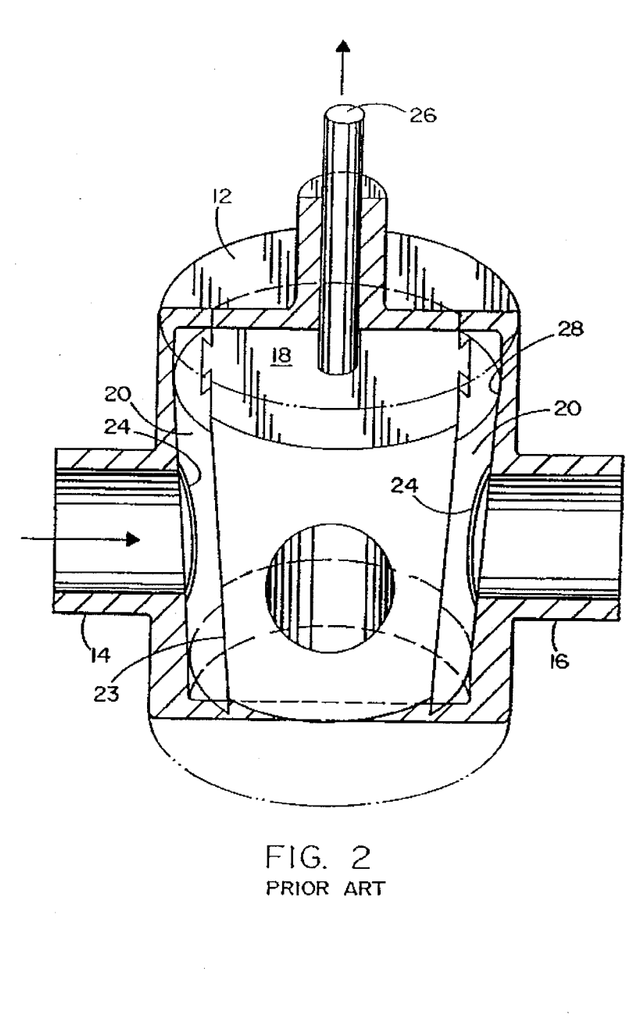

In order to open the prior art plug valve of FIG. 1, the first motion of plug 18 is vertically upward as illustrated in FIG. 2. As seen in FIG. 2, the configuration of the valve shown therein is substantially identical to that shown in FIG. 1 with the exception of the relative vertical position of the plug 18 and trunnion 26 with respect to the remaining portions of the valve 10. Furthermore, because the plug 18 has been moved upwardly as shown by the arrow at the top of FIG. 2, the relationship created by the dovetail interface between the plug 18 and the slips 20 along the plug/slip interface surface 23, causes the slips 20 to be retracted from the interior surface 28 of the valve body 12 immediately adjacent the inlet 14 and outlet 16. This retraction of the slips 20 disengages the seals 24 from the valve body surface thereby permitting rotation of the plug and attendant slips through a 90 degree turn to align the flow passage in a direction substantially parallel to the access through inlet 14 and outlet 16.

Figure 3:
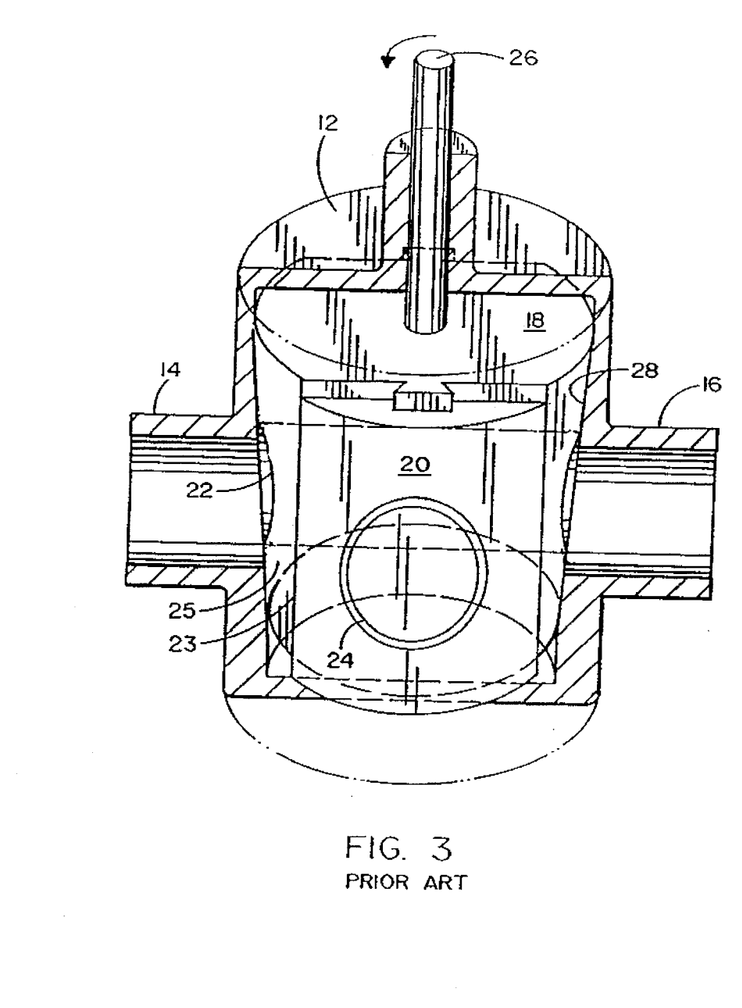

This third step in the process of opening the prior art valve of FIGS. 1 through 4 is illustrated in FIG. 3. More specifically, as seen in FIG. 3, the trunnion 26 and therefore the plug 18 to which the trunnion is affixed, have been rotated through an angle of substantially 90 degrees. As a result, the passage 22 is now at the appropriate angle to be aligned with the inlet and outlet. However, because it was necessary to retract the slips 20 for the rotation step of FIG. 3 and therefore move the plug upwardly with repsect to the slips, it will be seen that flow passage 22 is elevated above the inlet and outlet 14 and 16. Furthermore, it should be understood that the plug 18 is not properly seated in its open position with the plug surfaces 25 engaging the body interior surface 28 adjacent the inlet and outlet, respectively.

Figure 4:
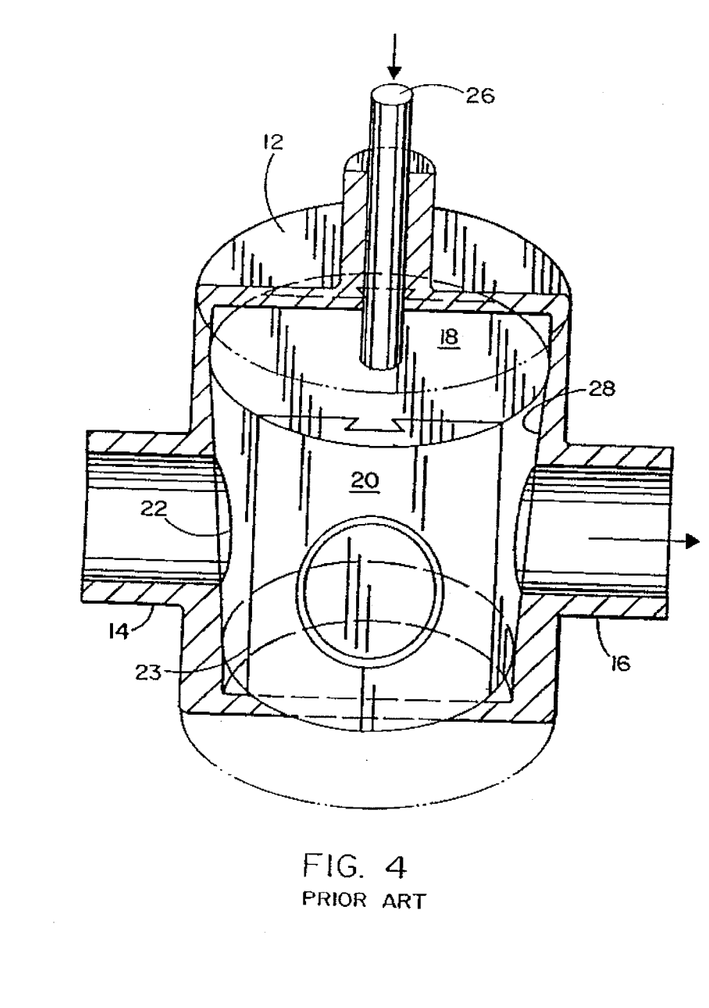

This final seating configuration is attained by the step illustrated in FIG. 4. More specifically, as shown in FIG. 4, a downward vertical force is applied to the trunnion 26 and therefore plug 18, causing the plug 18 to move vertically downward until the flow passage 22 is aligned with the inlet 14 and the outlet 16 so that all three are coaxial and the plug 18 is properly seated whereby the plug surface 25 firmly engages body interior surface 28.

In observing the valve configurations of FIGS. 1 trhough 4 it will also be observed that the plug 18 is, in combination with the slips 20, substantially symmetrical about its entire radial surface relative to the axis through the trunnion 26. That is, the combination of the plug 18 and the slips 20 forms a substantially circular conical truncation which is substantially congruent to the body interior surface 28 of valve body 12 in that the largest lateral dimension thereof is at the top or upper-most portion of the valve body 12 and the smallest lateral dimension thereof is at the bottom or lowermost portion of the valve body 12.

Referring now to FIGS. 5 through 9, it will be seen that the plug assembly 110 of the present invention comprises a plug 112, an upper trunnion 114 and a lower trunnion 116. The plug 112 has a pair of downwardly tapered surfaces 113 which, as will be seen hereinafter, form the blocking or shutoff surfaces of the plug assembly 110. Downwardly tapered surfaces 113 are on opposed segments of the plug 112 and face outwardly in a direction which is perpendicular to the waterway 118 of the plug 112. Plug 112 also comprises a pair of upwardly tapered surfaces 115, which as will be seen hereinafter, form the open thru-bore surfaces of the plug 112. The upwardly tapered surfaces 115 are positioned to face outwardly in a direction which is parallel to the axis of the waterway 118. As shown best in FIG. 5, the downwardly tapered surfaces 113, each have a dovetail 132 and the upwardly tapered surfaces each has a pair of dovetail halves 138. Dovetail 132 on each downwardly tapered surface 113 is provided to mate with a pair of shut-off slips, namely shut-off slip 120 and shut-off slip 122, each of which has a dovetail slot 134. Similarly, the upwardly tapered surfaces 115 are adapted by means of their respective dovetail halves 138 to mate with a pair of thru-bore slips, namely thru-bore slip 124 and thru-bore slip 126. Thru-bore slip 124 provides a thru-bore 128 and thru-bore slip 126 has a thru-bore 130. The mating is accomplished by a pair of dovetail half-slots 136 which cooperate with dovetail halves 138 on the surfaces 115.

Figure 5:
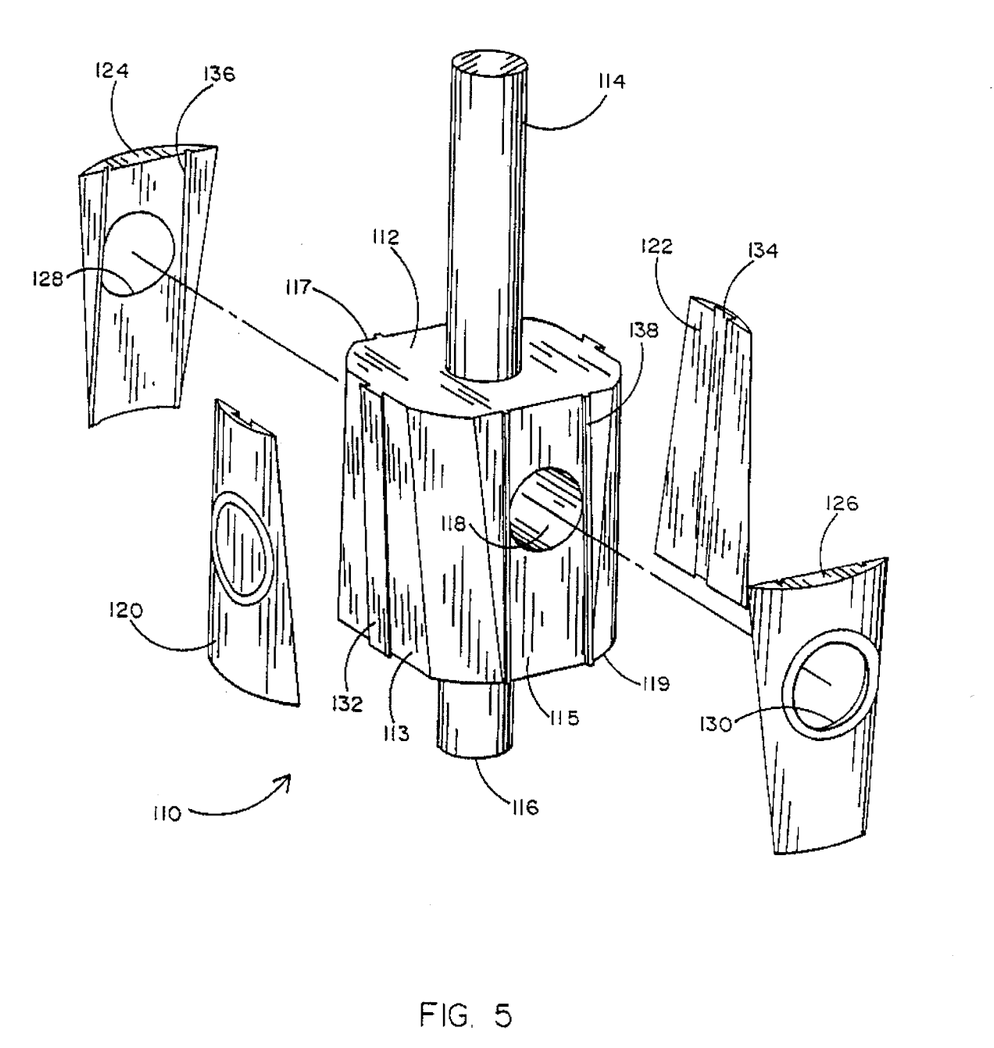
FIG. 5 is an exploded view of the improved plug assembly of the present invention.
Figure 6:
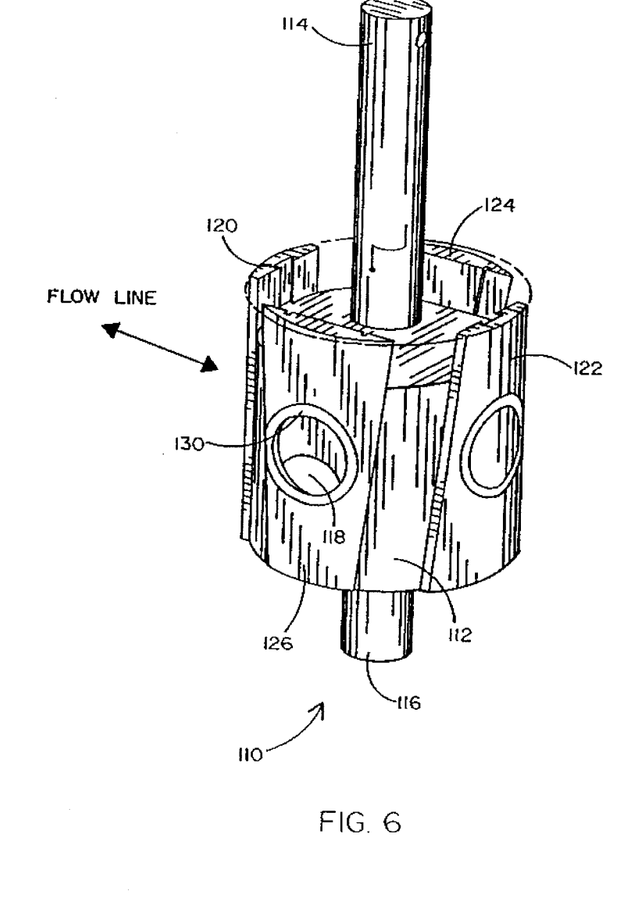
FIG. 6 is a view of the plug assembly of the present invention, shown fully assembled and in its closed configuration for positive shutoff of the flow line.

In the preferred embodiment shown herein, the plug 112 terminates at the upper end thereof in a relatively flat upper surface 117 and at the other end thereof, in a flat lower surface 119. A key feature of the present invention, namely the leak-proof configuration of the plug assembly when the valve is in its open configuration, is made possible by the nature of the tapered surfaces 113 and 115. More specifically, the downwardly tapered surfaces 113 are tapered in such a direction, that the distance between the opposed surfaces 113 is greater adjacent the upper plug surface 117, than it is adjacent the lower plug surface 119. As a result, when the plug 112 is moved vertically in an upward direction as seen in FIG. 5, the shut-off slips 120 and 122 are effectively retracted from the interior body cavity. On the other hand, the upwardly tapered surfaces are configured so that the distance between the opposed surfaces 115 across the plug 112 at the upper plug surface 117, is smaller than the distance between the surfaces 115, adjacent the lower plug surface 119. Consequently, as the plug 112 is moved in an upwardly vertical direction, as seen in FIG. 5, the thru-bore slip 124 and 126 move outwardly toward the inner body cavity surface.

The manner in which this unusually faceted tapered plug assembly may be used advantageously in a seat and reseat implementation may be better understood now by referring to FIGS. 6 through 9 which show sequentially, the nature of the relative movement between the plug 112 and the various slips 120, 122, 124 and 126. More specifically, referring now to FIG. 6, it will be seen that when the valve plug assembly is in its closed or positive shut-off configuration, that is with the plug in its seated position, lower most in the valve body, the shut-off slips 120 and 122 are fully seated against the valve body, thereby halting flow between the inlet and the outlet of the valve. At the same time, the thru-bore slips 124 and 126 are fully retracted from the valve body and displaced in overlapping relationship from the waterway 118, the latter being configured in a direction perpendicular to the flow line between the inlet and the outlet of the valve.

Figure 7:
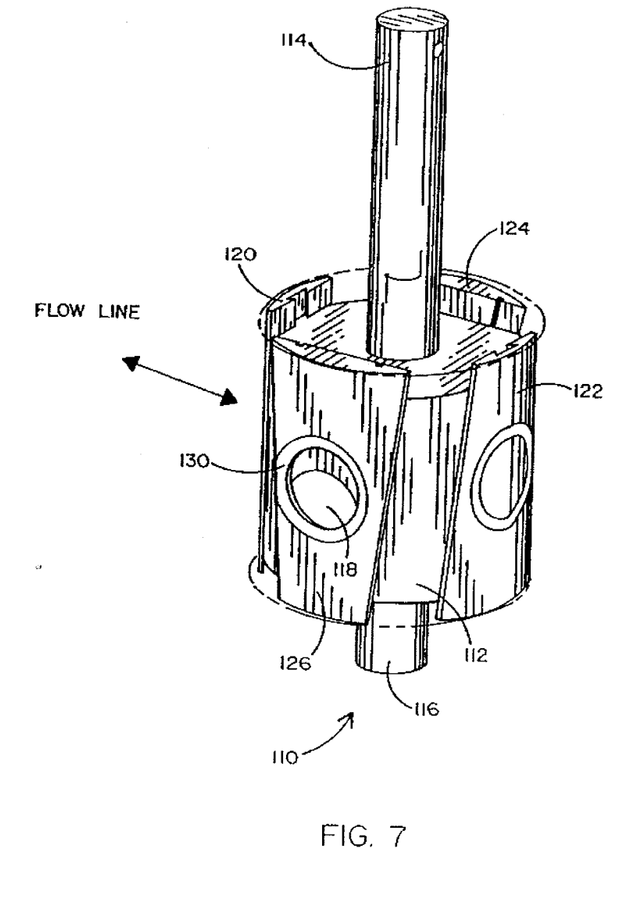
FIG. 7 is a view similar to that of FIG. 6, but showing the plug assembly of the present invention in its neutral, clockwise configuration after initial upstroke and in a condition ready for the quarter turn for opening the valve.
Figure 8:
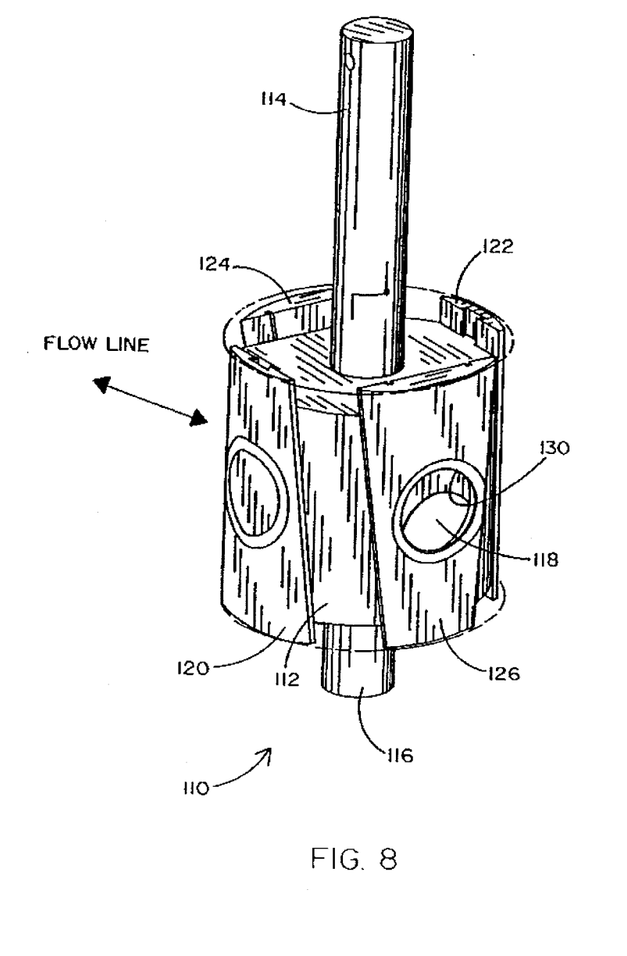
FIG. 8 is a view of the plug assembly of the present invention, similar to that of FIGS. 6 and 7, but showing the plug assembly after a quarter counter-clockwise turn, before reseating in its opened configuration.

In FIG. 7, it will be seen that the first direction of travel for opening the valve has been accomplished by moving the plug 112 in a vertical direction upwardly within the valve body. This is the neutral clockwise position which occurs after the upstroke of the plug wherein it is now ready for the quarter turn to continue valve opening and the configuration shown in FIG. 7, the shut-off slips 120 and 122 have begun to retract away from the valve body, the flow is no longer completely halted but is severely restricted. At the same time, the thru-bore slips begin to move toward the waterway as well as outwardly toward the valve body interior cavity surface. In effect, the configuration shown in FIG. 7, may be described as one in which all of the slips 120 through 126 are in a partially retracted configuration, but wherein the waterway 118 and the thru-bore slips 124 and 126 continue to reside in a direction which is perpendicular to the flow line. The next configuration of the valve plug assembly 110 of the present invention toward opening the valve is shown in FIG. 8. This is the neutral counter-clockwise configuration after the quarter turn of the plug 112, but before reseating. As shown in FIG. 8, in this configuration, all of the slips remain in their partially retracted position through the quarter turn. However, the waterway 118 and the thru-bore slips 124 and 126 are now positioned in a direction which is parallel to the flow line, thus reducing the flow restriction through the valve. In addition, the shut-off slips are now positioned on surfaces of the plug 112 which are perpendicular to the direction of the flow line.

Figure 9:
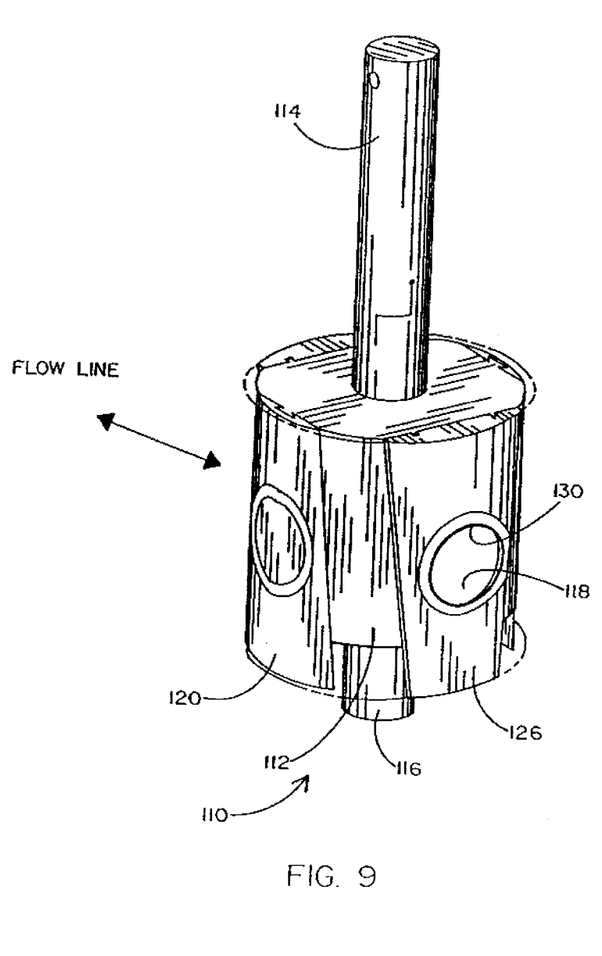
FIG. 9 is a view of the plug assembly of the present invention, similar to that of FIGS. 6 through 8, but illustrating the plug assembly in its reseated configuration, with an open through-bore flow line wherein the valve is in its fully opened configuration.

The final configuration of the valve in its fully open position as shown in FIG. 9. This position is achieved by again moving the plug 112 in a vertical upward direction. This is the fully opened or reseated configuration of the plug assembly in which the waterway 118 is totally unobstructed by the slips 124 and 126 and fully aligned with the flow line so that flow can be full between the inlet and the outlet of the valve. Thru-bores 128 and 130 are now fully aligned with the waterway 118. Furthermore, the thru-bore slips 124 and 126 are fully seated against the valve body and the shut-off slips 120 and 122 are fully retracted from the valve body.

It will be understood that because the thru-bore slips 124 and 126 are fully seated against the valve body and aligned with the plug bore over the waterway, fluid can flow through the plug 112 without any leakage into the interior of the valve cavity. Thus, even if one were to gain access to the interior of the valve cavity in the configuration shown in FIG. 9, one would not encounter any such leakage. Consequently, such access can permit repair or replacement of the shut-off slips 120 and 122, which because of the fully retracted configuration, can be manually removed simply by sliding the slips, so that the respective dovetails 132 and dovetail slots 134 are disengaged through a bottom plate of the valve and all of this can be accomplished without any leakage of fluid into the valve body cavity or externally of the valve.

Thus it will be understood that what has been disclosed herein comprises an improved plug type valve of the type having seat and reseat retractable seals, the plug assembly having a tapered faceted cylindrical plug with a waterway therethrough. A first pair of shut-off slips is positioned on the plug for axial movement, relative to the plug, wherein the plug surfaces adjacent the shut-off slips are tapered for retracting the shut-off slips as the plug is moved vertically in a first direction relative to the inlet and the outlet of the valve. A pair of thru-bore slips are positioned on the plug adjacent the waterway for relative axial movement therebetween. The plug surfaces adjacent the thru-bore slips are tapered for retracting the thru-bore slips as the plug is moved vertically in a second direction, relative to the inlet and outlet of the valve. The thru-bore slips have a thru-bore aperture to permit flow through the waterway without leakage around the plug and thus the interior of the valve body, when the waterway is aligned with the inlet and outlet.

Those having skill in the art to which the present invention pertains, will now as a result of the applicant's teaching herein, perceive various modifications and additions which may be made to the invention. By way of example, the embodiment illustrated herein is designed for opening the valve when the plug is moved in a vertically upward direction. However, it will be understood that the present invention may be readily configured so that the valve is opened when the plug is moved in a vertically downward direction. Furthermore, it will be understood that the various shapes, surface contours and relative sizes of the plug and slips disclosed herein are for purposes of illustration only and are not to be deemed limiting of the invention. Accordingly, all such modifications and additions are deemed to be within the scope of the invention which is to be limited only by the claims appended hereto and their equivalents.

I claim:

1. A plug assembly for a retractable seal-reseating element non-lubricated double block and bleed plug valve; the valve having an inlet and an outlet integral to a valve body and an operator for selectively orienting the plug within the valve body to either align a waterway with the inlet and outlet to open the valve or align the waterway substantially perpendicular to the inlet and outlet to close the valve; the assembly comprising:

a tapered, faceted, cylindrical plug having said waterway therethrough;

a pair of shut-off slips positioned on said plug for relative axial movement therebetween, the plug surfaces adjacent said shut-off slips being tapered for radially retracting said shut-off slips as said plug is moved axially in a first direction relative to said inlet and outlet;

a pair of thru-bore slips positioned on said plug adjacent said waterway for relative axial movement therebetween, the plug surfaces adjacent said thru-bore slips being tapered for radially retracting said thru-bore slips as said plug is moved axially in a second direction relative to said inlet and outlet;

said thru-bore slips each having a thru-bore aperture to permit flow through said waterway without leakage around said plug when said waterway is aligned with said inlet and outlet; and a trunnion attached to said operator for rotating and translating said plug, said shut-off slips and said thru-bore slips within said valve body.

2. The assembly recited in claim 1, wherein said first direction is toward said operator and said second direction is away from said operator.

3. The assembly recited in claim 1 wherein said trunnion is configured relative to said plug for rotating said plug about ninety degrees between opening and closing said valve.

4. The assembly recited in claim 1 wherein during said rotating of said plug, said shut-off slips and said thru-bore slips are retracted away from said valve body.

5. The assembly recited in claim 1 wherein said assembly is configured for opening said valve by first moving said plug axially in said first direction, rotating said plug a quarter turn and then moving said plug axially in said first direction again.

6. The assembly recited in claim 1 wherein said assembly is configured for closing said valve by first moving said plug axially in said second direction, rotating said plug a quarter turn and then moving said plug axially in said second direction again.

7. In a plug-type valve having an inlet and an outlet integral to a valve body and having an operator for selectively orienting a plug within the valve body to either align a waterway with the inlet and outlet to open the valve or align the waterway substantially perpendicular to the inlet and outlet to close the valve; a plug assembly comprising:

- a tapered, faceted, cylindrical plug having said waterway therethrough;
- a pair of shut-off slips positioned on said plug for relative axial movement therebetween, the plug surfaces adjacent said shut-off slips being tapered for radially retracting said shut-off slips as said plug is moved axially in a first direction relative to said inlet and outlet;
- a pair of thru-bore slips positioned on said plug adjacent said waterway for relative axial movement therebetween, the plug surfaces adjacent said thru-bore slips being tapered for radially retracting said thru-bore slips as said plug is moved axially in a second direction relative to said inlet and outlet;
- said thru-bore slips each having a thru-bore aperture to permit flow through said waterway without leakage around said plug when said waterway is aligned with said inlet and outlet; and
- a trunnion attached to said operator for rotating and translating said plug, said shut-off slips and said thru-bore slips within said valve body.

8. The assembly recited in claim 7, wherein said first direction is toward said operator and said second direction is away from said operator.

9. The assembly recited in claim 7 wherein said trunnion is configured relative to said plug for rotating said plug about ninety degrees between opening and closing said valve.

10. The assembly recited in claim 7 wherein during said rotating of said plug, said shut-off slips and said thru-bore slips are retracted away from said valve body.

11. The assembly recited in claim 7 wherein said assembly is configured for opening said valve by first moving said plug axially in said first direction, rotating said plug a quarter turn and then moving said plug axially in said first direction again.

12. The assembly recited in claim 7 wherein said assembly is configured for closing said valve by first moving said plug axially in said second direction, rotating said plug a quarter turn and then moving said plug axially in said second direction again.

* * * * *